(12) United States Patent
Choe et al.

(10) Patent No.: US 10,187,586 B2
(45) Date of Patent: *Jan. 22, 2019

(54) IMAGE GENERATION APPARATUS AND METHOD FOR GENERATING PLURALITY OF IMAGES WITH DIFFERENT RESOLUTION AND/OR BRIGHTNESS FROM SINGLE IMAGE

(71) Applicant: SAMSUNG ELECTRONICS CO., LTD., Suwon-si (KR)

(72) Inventors: Won-hee Choe, Gyeongju-si (KR); Myung-jin Eom, Seoul (KR); Chang-yeong Kim, Yongin-si (KR); Seong-deok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

This patent is subject to a terminal disclaimer.

(21) Appl. No.: 14/739,167

(22) Filed: Jun. 15, 2015

(65) Prior Publication Data

US 2015/0281542 A1 Oct. 1, 2015

Related U.S. Application Data

(63) Continuation of application No. 14/292,261, filed on May 30, 2014, now Pat. No. 9,077,908, which is a
(Continued)

(30) Foreign Application Priority Data

Sep. 6, 2006 (KR) .................. 10-2006-0085772

(51) Int. Cl.
*H04N 5/235* (2006.01)
*H04N 1/387* (2006.01)
(Continued)

(52) U.S. Cl.
CPC .......... *H04N 5/2353* (2013.01); *G06T 5/007* (2013.01); *G06T 5/009* (2013.01); *G06T 5/50* (2013.01);
(Continued)

(58) Field of Classification Search
CPC ........ H04N 5/2353; H04N 1/387; H04N 1/46; G06T 5/009; G06T 5/007; G06T 5/50
(Continued)

(56) References Cited

U.S. PATENT DOCUMENTS 5,436,662 A 7/1995 Nagasaki et al.
5,883,666 A 3/1999 Kyuma et al.
(Continued)

FOREIGN PATENT DOCUMENTS

CN 1413411 A 4/2003
CN 1467987 A 1/2004
(Continued)

OTHER PUBLICATIONS

Chinese Office Action for corresponding Chinese Patent Application No. 200710149179.7 dated May 12, 2010
(Continued)

*Primary Examiner* — Nhan T Tran
(74) *Attorney, Agent, or Firm* — NSIP Law

(57) ABSTRACT

Provided is an image generation system and method, more particularly, an image generation system and method which can generate a high dynamic range image from a plurality of images acquired in a single short exposure. The image generation system To includes an image generation system having an image acquisition unit to acquire an image, an image generation unit to generate, from the acquired image, a plurality of images with different resolution and brightness, and an image synthesis unit to synthesize the generated images.

18 Claims, 12 Drawing Sheets

Related U.S. Application Data continuation of application No. 11/826,165, filed on Jul. 12, 2007, now Pat. No. 8,773,709.

(51) Int. Cl.
*G06T 5/00* (2006.01)
*H04N 1/46* (2006.01)
*G06T 5/50* (2006.01)

(52) U.S. Cl.
CPC ............... *H04N 1/387* (2013.01); *H04N 1/46* (2013.01); *G06T 2207/20208* (2013.01); *G06T 2207/20221* (2013.01)

(58) Field of Classification Search
USPC ............................................... 348/222.1, 239
See application file for complete search history.

(56) References Cited

U.S. PATENT DOCUMENTS

| | | | |
|---|---|---|---|
| 6,075,584 | A | 6/2000 | Tsai |
| 6,837,432 | B2 | 1/2005 | Tsikos et al. |
| 7,756,330 | B2 | 7/2010 | Border et al. |
| 8,023,015 | B2 | 9/2011 | Chung et al. |
| 8,446,481 | B1 | 5/2013 | Geiss |
| 8,773,709 | B2 * | 7/2014 | Choe .................... H04N 5/2353 358/1.15 |
| 9,077,908 | B2 * | 7/2015 | Choe .................... H04N 5/2353 |
| 2003/0103670 | A1 * | 6/2003 | Schoelkopf ........... G06T 11/001 382/162 |
| 2003/0110345 | A1 | 6/2003 | Kurohmaru |
| 2004/0109177 | A1 | 6/2004 | Kaburagi |
| 2006/0066750 | A1 | 3/2006 | Henderson et al. |
| 2006/0133667 | A1 | 6/2006 | Schoelkopf et al. |
| 2006/0245014 | A1 | 11/2006 | Haneda |
| 2007/0188613 | A1 | 8/2007 | Nobori et al. |
| 2008/0025634 | A1 * | 1/2008 | Border ................. H04N 5/2355 348/E3.02 |
| 2008/0112644 | A1 | 5/2008 | Yokohata et al. |
| 2009/0015690 | A1 | 1/2009 | Yamashita |
| 2013/0308012 | A1 | 11/2013 | Fukutomi |
| 2014/0119668 | A1 | 5/2014 | Kwon et al. |
| 2014/0218559 | A1 | 8/2014 | Yamaguchi et al. |

FOREIGN PATENT DOCUMENTS

| | | | |
|---|---|---|---|
| CN | 1604613 A | 4/2005 | |
| EP | 1204072 A2 * | 5/2002 | ........... G06T 3/4023 |
| JP | 8-214211 | 8/1996 | |
| JP | 10-173988 | 6/1998 | |
| JP | 11-313247 | 11/1999 | |
| JP | 11-317905 | 11/1999 | |
| JP | 2002-64754 | 2/2002 | |
| JP | 2009-545233 | 12/2009 | |
| WO | WO 2008/013770 | 1/2008 | |

OTHER PUBLICATIONS

Japanese Office Action dated Jun. 19, 2012 issued in corresponding Japanese Patent Application No. 2007-208347.
U.S. Office Action dated Mar. 29, 2011 in the U.S. Patent and Trademark Office in corresponding U.S. Appl. No. 11/826,165.
U.S. Office Action dated Oct. 11, 2011 in the U.S. Patent and Trademark Office in corresponding U.S. Appl. No. 11/826,165.
U.S. Office Action dated Jul. 3, 2012 in the U.S. Patent and Trademark Office in corresponding U.S. Appl. No. 11/826,165.
U.S. Office Action dated Sep. 5, 2013 in the U.S. Patent and Trademark Office in corresponding U.S. Appl. No. 11/826,165.
U.S. Office Action dated Apr. 26, 2013 in the U.S. Patent and Trademark Office in corresponding U.S. Appl. No. 11/826,165.
U.S. Notice of Allowance dated Feb. 26, 2014 in the U.S. Patent and Trademark Office in corresponding U.S. Appl. No. 11/826,165.

* cited by examiner

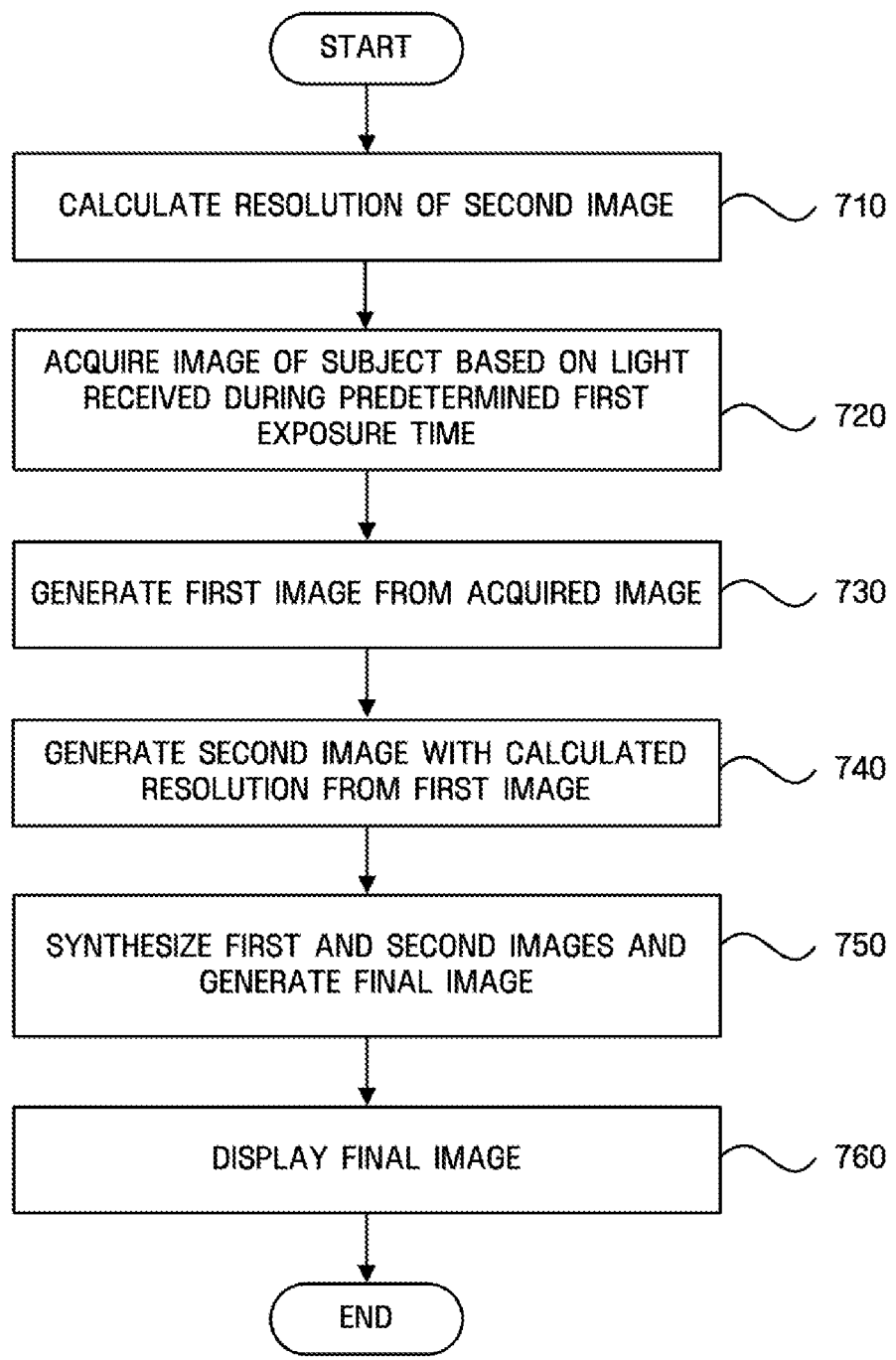

IMAGE GENERATION APPARATUS AND METHOD FOR GENERATING PLURALITY OF IMAGES WITH DIFFERENT RESOLUTION AND/OR BRIGHTNESS FROM SINGLE IMAGE

CROSS-REFERENCE TO RELATED APPLICATIONS

This application is a continuation of U.S. application Ser. No. 14/292,261, filed on May 30, 2014, in the U.S. Patent and Trademark Office, which is a continuation application of U.S. application Ser. No. 11/826,165, filed on Jul. 12, 2007, in the U.S. Patent and Trademark Office, which claims priority of Korean Patent Application No. 10-2006-0085772, filed on Sep. 6, 2006, in the Korean Intellectual Property Office, the entire disclosures of which are incorporated herein by reference.

BACKGROUND

1. Field

One or more embodiments of the present invention relate to an image generation system, method and medium, and more particularly, to an image generation system, method and medium which can acquire a plurality of images with different luminance in a single photographing operation and generate a high dynamic range image from the acquired images.

2. Description of the Related Art

When image photographing apparatuses, such as digital cameras and camcorders, photograph a subject against background light, they generate images having different exposures in order to enhance image sensitivity. Then, the image photographing apparatuses synthesize the generated images and provide the synthesized image to a user.

Specifically, when an identical subject is photographed using different exposure times, the shorter the exposure time, the higher the contrast of the image and thus the clearer the edges of the image. In addition, the longer the exposure time, the clearer the color of the image. Therefore, if an image acquired using a long exposure time and an image acquired using a short exposure time are synthesized, a high dynamic range image can be obtained.

Referring to FIG. 1, a conventional image photographing apparatus generates a first image 11 acquired using a short exposure time, and a second image 12 acquired using a longer exposure time relative to the first image 11, synthesizes the first and second images 11 and 12, and generates a high dynamic range image 13.

In order to acquire images with different luminance through multiple exposures, a user has to maintain the same posture for a predetermined period of time, which is usually inconvenient to the user. Furthermore, if the user's hands tremble or shake while maintaining the same posture, image blurring occurs. Alternatively, even if the user can maintain the same posture for the predetermined period of time, if the position of a subject is changed while the user is taking photographs of the subject, the images acquired through the photographing operation are not identical. Consequently, it is difficult to generate a normal image.

A method of changing structures, such as modifying an array of color filters or varying sensitivity of the color filters, has been used so as to eliminate the inconvenience of users having to the maintain the same posture for a predetermined period of time. However, the method requires additional processing, such as demosaicing of the color filters and white balancing.

U.S. Patent Publication No. 2006-0066750 discloses an image sensor which can generate a wide dynamic range image by exposing odd-numbered columns of pixels in a pixel array for a short period of time, exposing even-numbered columns of pixels in the pixel array for a longer period of time than the odd-numbered columns of pixels, combining the odd-numbered columns of pixels and the even-numbered columns of pixels into respective pairs, and outputting the respective pairs of the odd-numbered columns of pixels and the even-numbered columns of pixels. However, the conventional art fails to suggest a method of eliminating the inconvenience to users of having to maintain the same posture for a long exposure time, or a technique for preventing image blurring due to the trembling hands of the users.

In this regard, a method of generating a high dynamic range image using images acquired in a single short exposure is required.

SUMMARY

One or more embodiments of the present invention provide an image generation system, method and medium, which can generate a high dynamic range image from a plurality of image acquired in a single, short exposure.

Additional aspects and/or advantages of the invention will be set forth in part in the description which follows and, in part, will be apparent from the description, or may be learned by practice of the invention.

To achieve at least the above and/or other aspects and advantages, embodiments of the present invention include an image generation system including, an image acquisition unit to acquire an image, an image generation unit to generate, from the acquired image, a plurality of images with different resolution and brightness, and an image synthesis unit to synthesize the generated images.

To achieve at least the above and/or other aspects and advantages, embodiments of the present invention include an image generation method including, acquiring an image, generating, from the acquired image, a plurality of images with different resolution and brightness, and synthesizing the generated images.

To achieve at least the above and/or other aspects and advantages, embodiments of the present invention include an image generation method including, generating a plurality of images with different resolution and brightness from an acquired image, and synthesizing the generated images.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 14 illustrates an image generation method, such as used by the image generation system of FIG. 13, according to an embodiment of the present invention.

DETAILED DESCRIPTION

Figure 1:
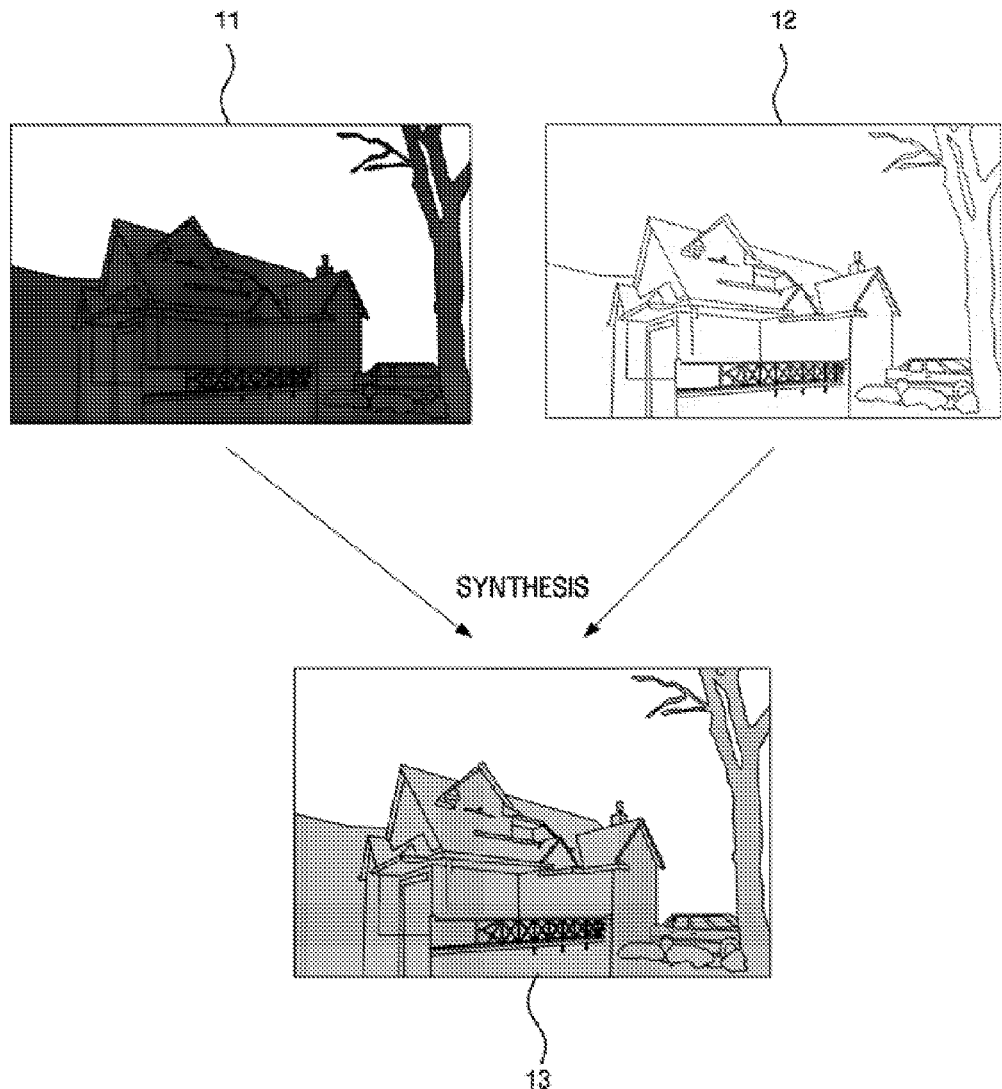
FIG. 1 illustrates a conventional image generation process.

Reference will now be made in detail to embodiments of the present invention, examples of which are illustrated in the accompanying drawings, wherein like reference numerals refer to the like elements throughout. Embodiments are described below to explain the present invention by referring to the figures.

Figures 2, 3:
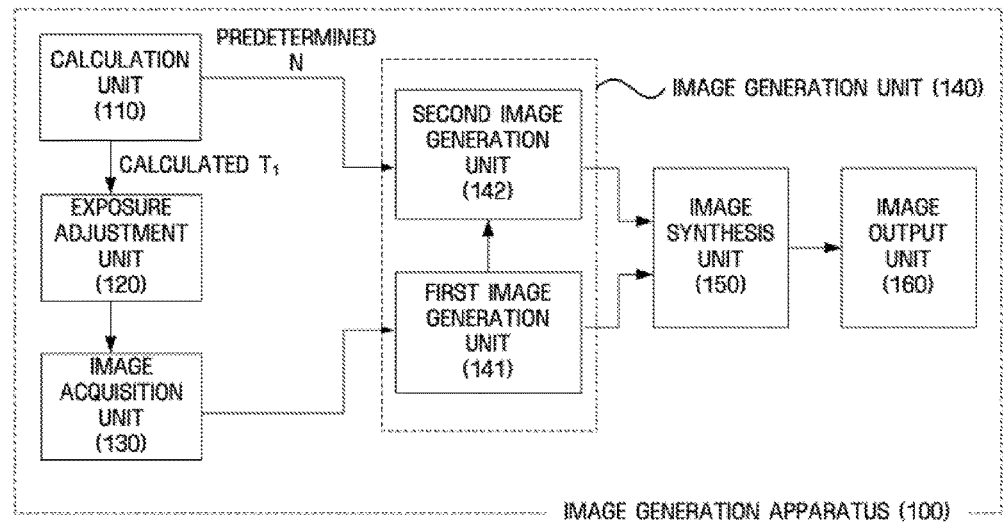
FIG. 2 illustrates an image generation system, according to a first embodiment of the present invention.
FIG. 3 illustrates an example of a first image generated by a first image generation unit, such as illustrated in FIG. 2, according to an embodiment of the present invention.

FIG. 2 illustrates an image generation system 100, according to an embodiment of the present invention. The image generation system 100 may be understood to include any type of apparatus, such as a digital camera, a camcorder, a cellular phone, or a personal digital assistant (PDA) which may include a module for photographing an image (a still image or a moving image). Hereinafter, embodiments may be described in which the image generation system 100 is a digital camera, which can photograph an image of a subject, as an example.

Specifically, referring to FIG. 2, the image generation system 100 may include, for example, a calculation unit 110, an exposure adjustment unit 120, an image acquisition unit 130, an image generation unit 140, an image synthesis unit 150, and an image output unit 160.

The calculation unit 110 may calculate an exposure time required for the image acquisition unit 130, which will be described in greater detail later, to acquire an image.

The exposure adjustment unit 120 may adjust a shutter based on the exposure time calculated by the calculation unit 110. In the case of a camera sensor without a mechanical shutter, an optical sensor may adjust the time spent on receiving light. Therefore, an image acquired by the image acquisition unit 130, which will be described in greater detail later, may have the appropriate brightness. The present embodiment is described using an example in which the image generation unit 100 is a digital camera. However, this is merely an example used to help promote the understanding of embodiments of the present invention, and the present invention is not limited thereto. In other words, the present invention can be applied, in a similar manner, to any apparatus that can photograph a still image or a moving image.

The image acquisition unit 130 may acquire an image of a subject based on an amount of light received during the exposure time calculated by the calculation unit 110. The image acquired by the image acquisition unit 130 may be provided to the image generation unit 140, which will hereinafter be described in greater detail.

The image generation unit 140 may generate a plurality of images having different resolution and brightness from the image acquired by the image acquisition unit 130. To this end, the image generation unit 140 may include a first image generation unit 141 generating a first image and a second image generation unit 142 generating a second image with lower resolution than the first image.

Specifically, the first image generation unit 141 may generate the first image from the image acquired by the image acquisition unit 130. In the present embodiment, the first image may be understood as the image acquired by the image acquisition unit 130. The first image may have resolution corresponding to the number of pixels included in a CMOS (complementary metal-oxide semiconductor) image sensor (CIS) of the image generation system 100. For example, it may be assumed that color filters r1 through r4, g1 through g8 and b1 through b4 are formed in each pixel included in the CIS of the image generation system 100, as illustrated in FIG. 3. In this case, the first image may have resolution corresponding to the color filters r1 through r4, g1 through g8 and b1 through b4. Here, r, g and b may be understood as red, green and blue filters, respectively.

The second image generation unit 142 may generate the second image with lower resolution than the first image, from the first image. Specifically, the second image generation unit 142 may generate the second image, having lower resolution than the first image, from the first image using pixels, which use an identical color filter, as a single pixel. The resolution of the second image may be represented by the resolution of the first image as in Equation (1) below.

$$\text{Resolution of second image} = \text{resolution of first image} \times \frac{1}{N}, \quad \text{Equation 1}$$

where N may indicate the number of pixels of the first image included in each pixel of the second image. For example, if N=4, the second image generation unit 142 may generate the second image having a quarter of the pixels included in the first image. In this case, the second image may have resolution corresponding to R1, G1, G2 and B1. R1 may be understood as r1+r2+r3+r4, G1 may be understood as g1+g2+g5+g6, G2 may be understood as g3+g4+g7+g8, and B1 may be understood as b1+b2+b3+b4. In addition, R, G and B may be understood as red, green and blue filters, respectively.

As described above, since each pixel of the second image may consist of a plurality of pixels using an identical color filter in the first image, the second image may be brighter than the first image. Specifically, the brightness of the second image may be increased by the number of pixels of the first image included in each pixel of the second image, as compared with the brightness of the first image. For example, as described above, if each pixel of the second image consists of four pixels of the first image, the brightness of the second image may be increased to four times that of the first image.

According to an embodiment of the present invention, information regarding the resolution and appropriate brightness of the second image may be predetermined. In this case, the calculation unit 110 may calculate an exposure time (hereinafter referred to as a "first exposure time") for acquiring the first image based on an exposure time (hereinafter referred to as a "second exposure time") for acquiring the second image with predetermined brightness and resolution of the second image. The first exposure time is given by Equation (2).

$$T_1 = \frac{T_2}{N}, \quad \text{Equation 2}$$

where T1 may indicate the first exposure time and T2 may indicate the second exposure time. In addition, N may indicate the number of pixels of the first image included in each pixel of the second image, as, for example, in Equation (1).

Figure 5:
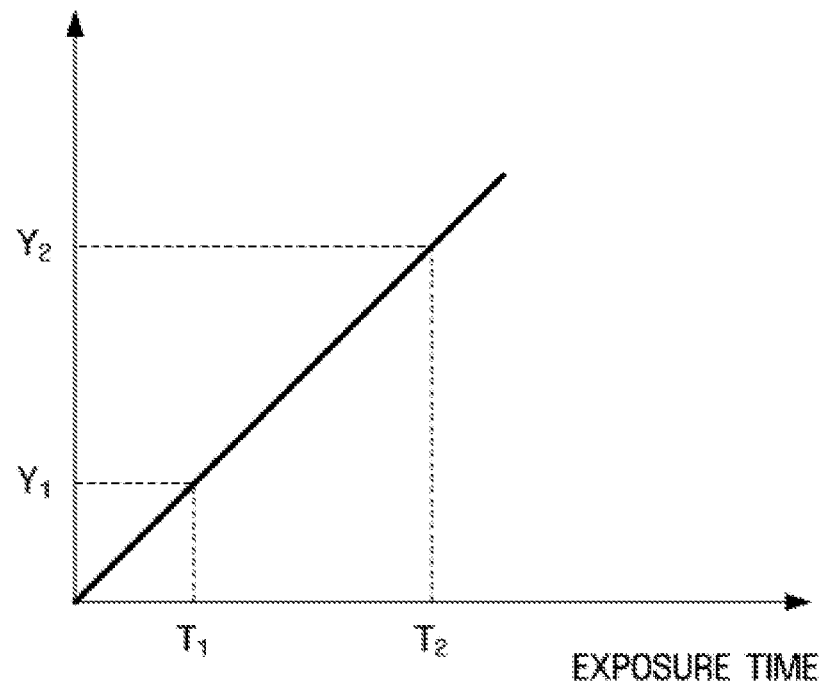
FIG. 5 illustrates an exposure time-brightness function, according to an embodiment of the present invention.

In Equation (2), the second exposure time T2 may be calculated using an exposure time-brightness function. FIG. 5 illustrates an exposure time-brightness function according to an embodiment of the present invention. The exposure time-brightness function may define the relationship between exposure time and brightness of an image. In the exposure time-brightness function, a horizontal axis indicates an exposure time, and a vertical axis indicates brightness of the image corresponding to the exposure time. Therefore, if brightness Y2 of the second image is predetermined, the second exposure time T2 for acquiring the second image with the predetermined brightness Y2 may be calculated using the exposure time-brightness function.

The image synthesis unit 150 may synthesize the first image generated by the first image generation unit 141 and the second image generated by the second image generation unit 142 and may generate a final image. Here, the first and second images may be synthesized using a variety of methods.

In an embodiment of the present invention, the image synthesis unit 150 may increase the resolution of the second image to that of the first image and synthesize the first image and the second image with increased resolution (hereinafter referred to as "first synthesis"). Here, the image synthesis unit 150 may increase the resolution of the second image to that of the first image through, for example, linear interpolation. A final image generated through the first synthesis may be displayed on the image output unit 160 without additional processing processes.

In another embodiment of the present invention, the image synthesis unit 150 may reduce the resolution of the first image to that of the second image and synthesize the second image and the first image with reduced resolution (hereinafter referred to as "second synthesis"). Since a final image generated through the second synthesis has resolution reduced to that of the second image, the image synthesis unit 150 may increase the resolution of the final image to that of the first image and display the final image with increased resolution on the image output unit 160.

Figure 4:
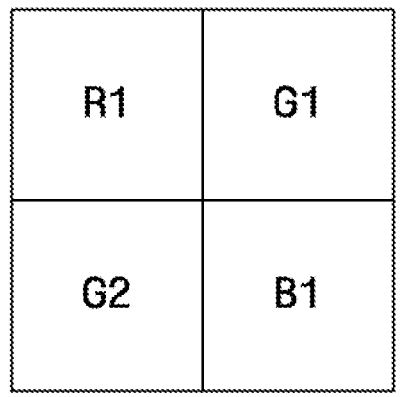
FIG. 4 illustrates an example of a second image generated by a second image generation unit, such as illustrated in FIG. 2, according to an embodiment of the present invention.

In addition to the first synthesis and the second synthesis described above, the image synthesis unit 150 may generate a final image by correcting brightness and color information of the first image with reference to brightness and color information of the second image (hereinafter referred to as "third synthesis"). Specifically, the image synthesis unit 150 may refer to brightness and color information of a pixel in the second image and correct brightness and color information of pixels of the first image used in the pixel of the second image, based on the brightness and color information referred to. For example, if the first and second images are as illustrated in FIGS. 3 and 4, respectively, the image synthesis unit 150 may refer to brightness and color information of the pixel R1 of the second image and correct brightness and color information of the pixels of the first image that form the pixel R1 of the second image, that is, the pixels r1, r2, r3 and r4, based on the brightness and color information referred to.

The image output unit 160 may display a final image generated by the image synthesis unit 150. The display unit 160 may be any type of electronic display, such as a liquid crystal display (LCD), a plasma display panel (PDP), a light emitting diode (LED), an organic LED (OLED), or a flexible display.

Although not shown, the image generation system 100 may include a storage unit. The storage unit may store the first image generated by the first image generation unit 141, the second image generated by the second image generation unit 142, and the final image generated by the image synthesis unit 150, for example. The storage unit may further store resolution information of the first image, resolution information of the second image, and predetermined brightness information of the second image. In the above example, the first image, the second image, the final image, and the resolution information may all be stored in one storage unit. However, the present invention is not limited thereto. The first image, the second image, the final image and the resolution information may be stored in respective storage units.

Figure 6:
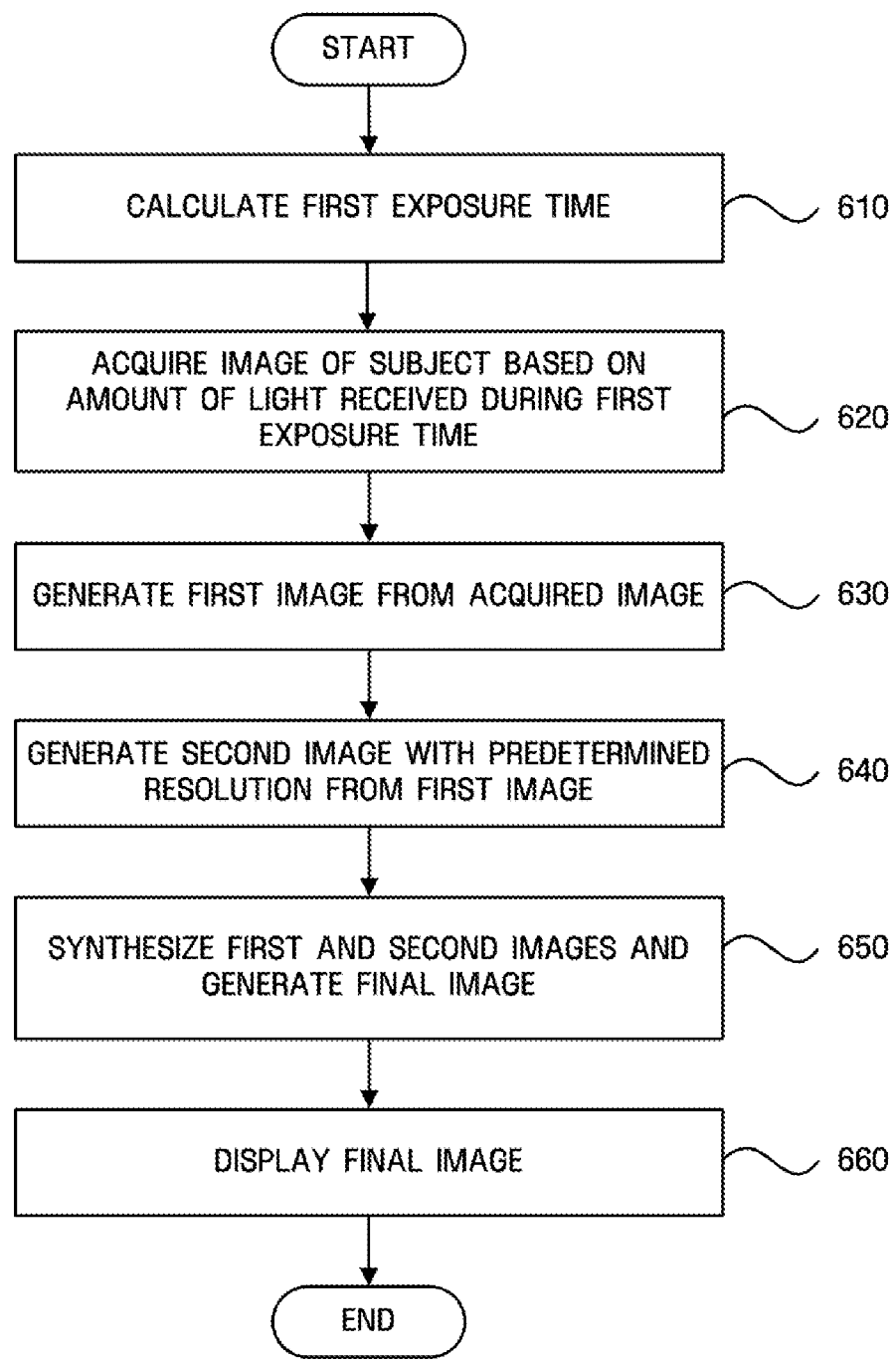
FIG. 6 is a flowchart illustrating an image generation method used by the image generation system, such as of FIG. 2, according to an embodiment of the present invention.

FIG. 6 illustrates an image generation method, such as used by the image generation system 100 of FIG. 2.

The first exposure time for acquiring the first image may be calculated in operation 610, e.g., by the calculation unit. The first exposure time may be calculated, for example, using Equation (2).

Operation 610 may include an operation of calculating the second exposure time T2 for acquiring the second image with the predetermined brightness Y2 based on the predetermined brightness Y2 of the second image and an operation of calculating the first exposure time by dividing the calculated second exposure time T2 by the number N of pixels of the first image included in each pixel of the second image.

The shutter may be adjusted, e.g., by the exposure adjustment unit 120, during the first exposure time, e.g., calculated by the calculation unit 110, or the time spent on receiving light by the optical sensor. An image of a subject may be acquired, e.g., by the image acquisition unit 130, based on the amount of light received during the first exposure time, in operation 620.

Once the image is acquired, e.g., by the image acquisition unit 130, the first image may be generated from the acquired image in operation 630, e.g. by the first image generation unit 141. In the present embodiment, the first image may be understood as being identical to the acquired image.

If the first image is acquired, the second image, which has lower resolution than the first image, may be generated from the first image in operation 640, e.g., by the second image generation unit 142. Here, the second image may be generated according to a predetermined resolution of the second image, e.g., by the second image generation unit 142. Specifically, if the resolution of the second image is 1/N of that of the first image, the second image may be generated using N pixels, which use an identical color filter, in the first image as one pixel, e.g., by the second image generation unit 142.

A final image may be generated by synthesizing the first and second images in operation 650, e.g., by the image synthesis unit 150. When generating the final image by synthesizing the first and second images, the resolution of one of the first image and the second image may be adjusted to match the resolution of the other first and second images and the first and second images may be synthesized with matching resolution, e.g., by the image synthesis unit 150. The first and second images may be synthesized using a first synthesis method or a second synthesis method. A method of generating a final image using the first synthesis method and a method of generating a final image using the second synthesis method will be described in greater detail later with reference to FIGS. 7 through 10.

In addition to generating the final image by synthesizing the first and second images with matching resolution, the final image may be generated using a third synthesis method, e.g., by the image synthesis unit 150. A method of generating a final image using the third synthesis method will be described in greater detail later with reference to FIGS. 11 and 12.

The image output unit 160 may display the final image generated by the image synthesis unit 150.

Hereinafter, a method of generating a final image using the first synthesis method will be described with reference to FIGS. 7 and 8.

Figure 7:
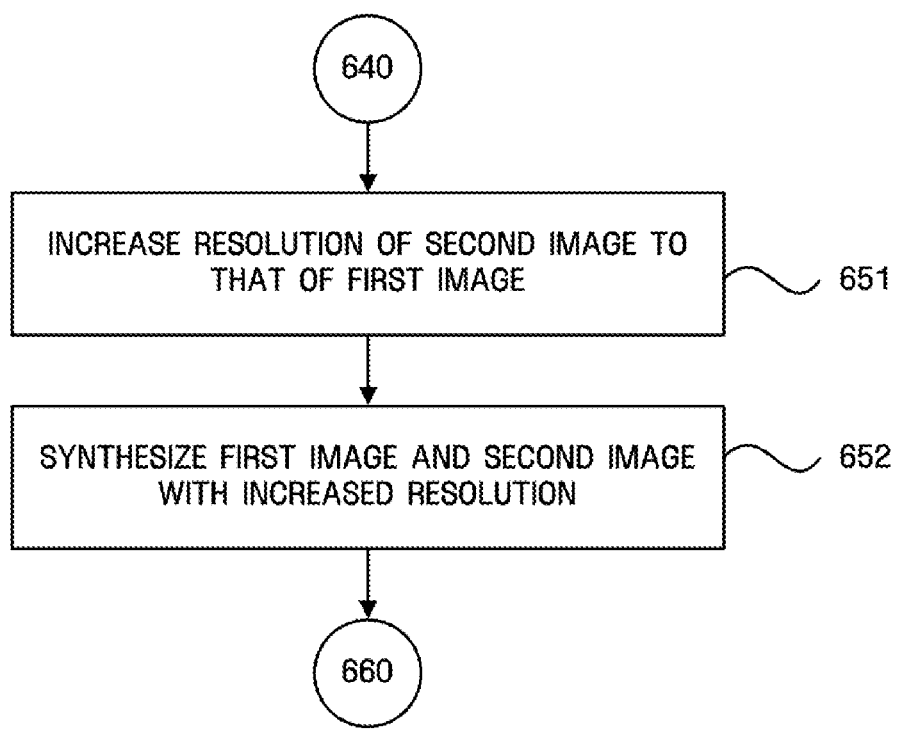
FIG. 7 illustrates a first synthesis method, according to an embodiment of the present invention.

FIG. 7 illustrates operation 650 of FIG. 6 in greater detail, assuming that a final image is generated using the first synthesis method.

Referring to FIG. 7, resolution of the second image may be increased to that of the first image while maintaining the resolution of the first image unchanged, so that the resolution of the second image can match that of the first image in operation 651, e.g., by the image synthesis unit 150. Here, the resolution of the second image may be increased through, for example, linear interpolation. After increasing the resolution of the second image, the first image and the second image may be synthesized with increased resolution and a final image may be generated in operation 652, e.g., by the image synthesis unit 150.

Figure 8:
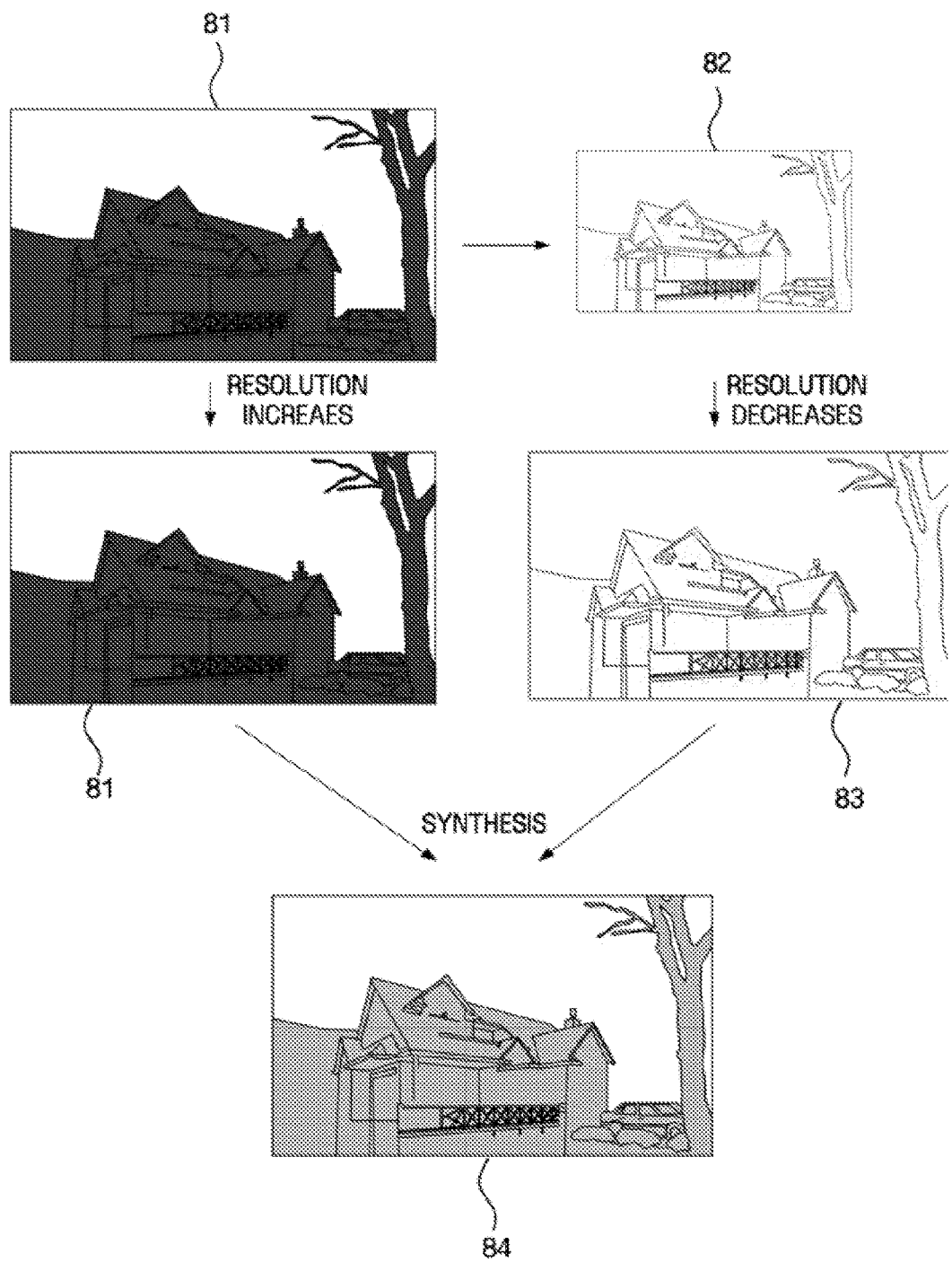
FIG. 8 illustrates a process of generating a final image using the first synthesis method of FIG. 7, according to an embodiment of the present invention.

FIG. 8 illustrates a process of generating a final image using the first synthesis method of FIG. 7.

Referring to FIG. 8, a first image 81 may be generated, e.g., by the first image generation unit 141, from an image, e.g., an image acquired by the image acquisition unit 130, and a second image 82 may be generated from the first image 81, e.g., by the second image generation unit 142, with resolution and brightness different from that of the first image 81. Since the first image 81 has higher contrast than the second image 82, its edges may be clearer. In addition, the color of the second image 82 may be clearer than that of the first image 81.

Next, the resolution of the second image 82 may be increased to that of the first image 81, e.g., by the image synthesis unit 150. Then, the first image 81 and a second image 83 may be synthesized with increased resolution and a final image 84 may be generated, e.g., by the image synthesis unit 150. Here, since the contrast of the final image 84 is between the contrast of the first image 81 and the contrast of the second image 82, the final image 84 may have a clear color, as well as a clear edge. The final image 84 may be displayed, e.g., on the image output unit 160.

Hereinafter, a method of generating a final image using the second synthesis method will be described with reference to FIGS. 9 and 10.

Figure 9:
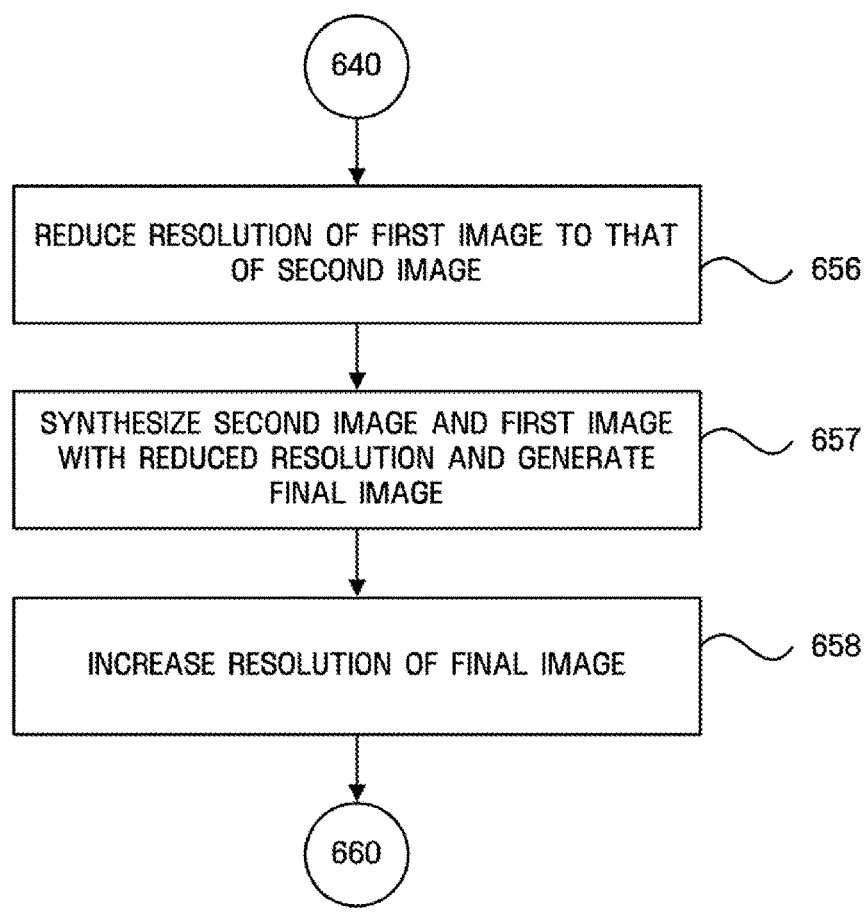
FIG. 9 illustrates a second synthesis method, according to an embodiment of the present invention.

FIG. 9 illustrates operation 650 of FIG. 6 in greater detail, assuming that a final image is generated using the second synthesis method.

Referring to FIG. 9, the resolution of the first image may be reduced to that of the second image while maintaining the resolution of the second image unchanged so that the resolution of the first image can match that of the second image in operation 656, e.g., by the image synthesis unit 150. After reducing the resolution of the first image the second image and the first image may be synthesized with reduced resolution and a final image may be generated in operation 657, e.g., by the image synthesis unit 150. Then, the resolution of the final image may be increased to that of the first image in operation 658, e.g., by the image synthesis unit 150.

Figure 10:
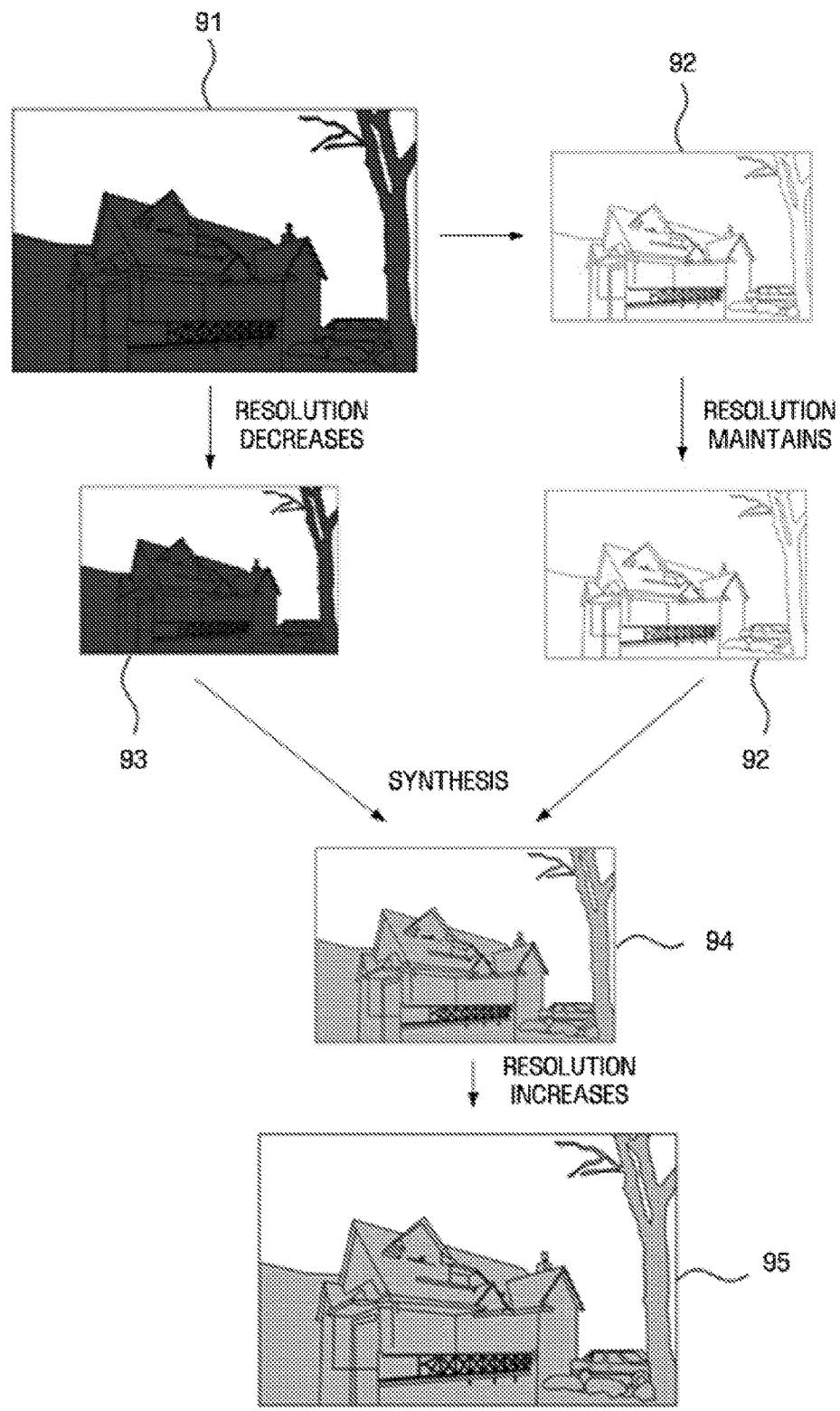
FIG. 10 illustrates a process of generating a final image using the second synthesis method of FIG. 9, according to an embodiment of the present invention.

FIG. 10 illustrates a process of generating a final image using the second synthesis method of FIG. 9.

Referring to FIG. 10, a first image 91 may be generated, e.g., by the first image generation unit 141, from an image, e.g., an image acquired by the image acquisition unit 130, and a second image 92 by generated from the first image 91 with resolution and brightness different from the first image 91, e.g. by the second image generation unit 142. Here, the second image 92 may be generated from the first image 91, e.g., by the second image generation unit 142, according to predetermined resolution of the second image 92. Since the first image 91 has higher contrast than the second image 92, its edges may be clearer. In addition, the color of the second image 92 may be clearer than that of the first image 91.

Next, the resolution of the first image 91 may be reduced to that of the second image 92, e.g., by the image synthesis unit 150. Then, the second image 92 and a first image 93 may be synthesized with reduced resolution and a final image 94 may be generated, e.g., by the image synthesis unit 150. Since the resolution of the final image 94 may be reduced to that of the second image 92, the resolution of the final image 94 may be increased to that of the first image 91, e.g., by the image synthesis unit 150. A final image 95 with increased resolution may be displayed, e.g., on the image output unit 160.

Hereinafter, a method of generating a final image using the third synthesis method will be described with reference to FIGS. 11 and 12.

Figure 11:
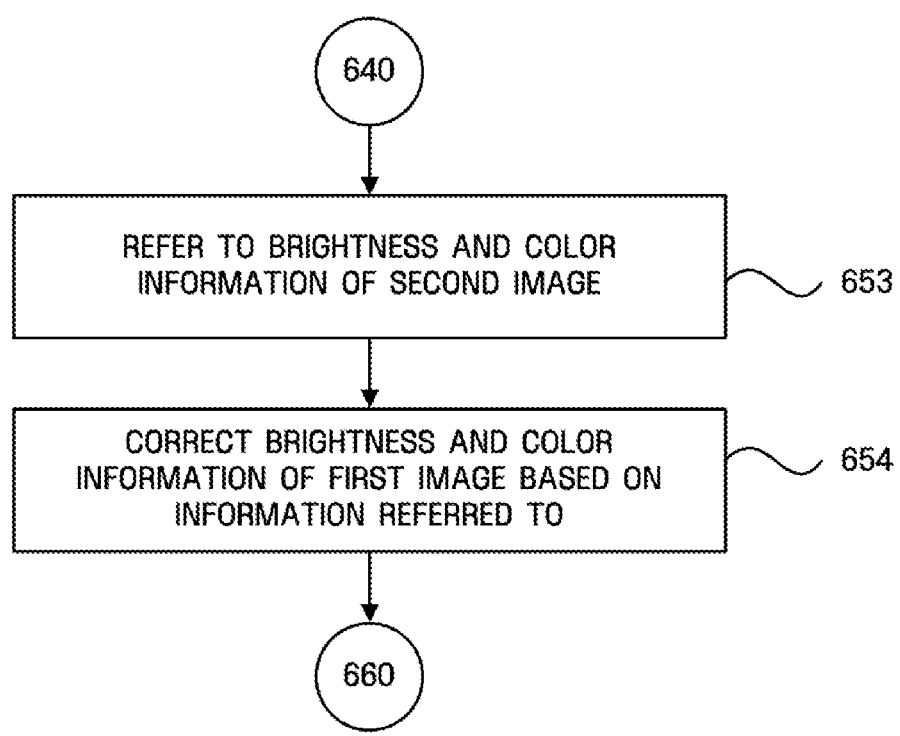
FIG. 11 illustrates a third synthesis method, according to an embodiment of the present invention.

FIG. 11 illustrates operation 650 of FIG. 6 in greater detail, assuming that a final image is generated using the third synthesis method.

Referring to FIG. 11, brightness and color information of the second image may be referred to in operation 653, e.g., by the image synthesis unit 150. Then, the brightness and color of the first image may be corrected based on the referred brightness and color information of the second image and a final image may be generated in operation 654, e.g., by the image synthesis unit 150. Specifically, brightness and color information of a pixel in the second image may be referred to and the brightness and color of pixels of the first image used in the pixel of the second image may be corrected, based on the brightness and color information referred to.

Figure 12:
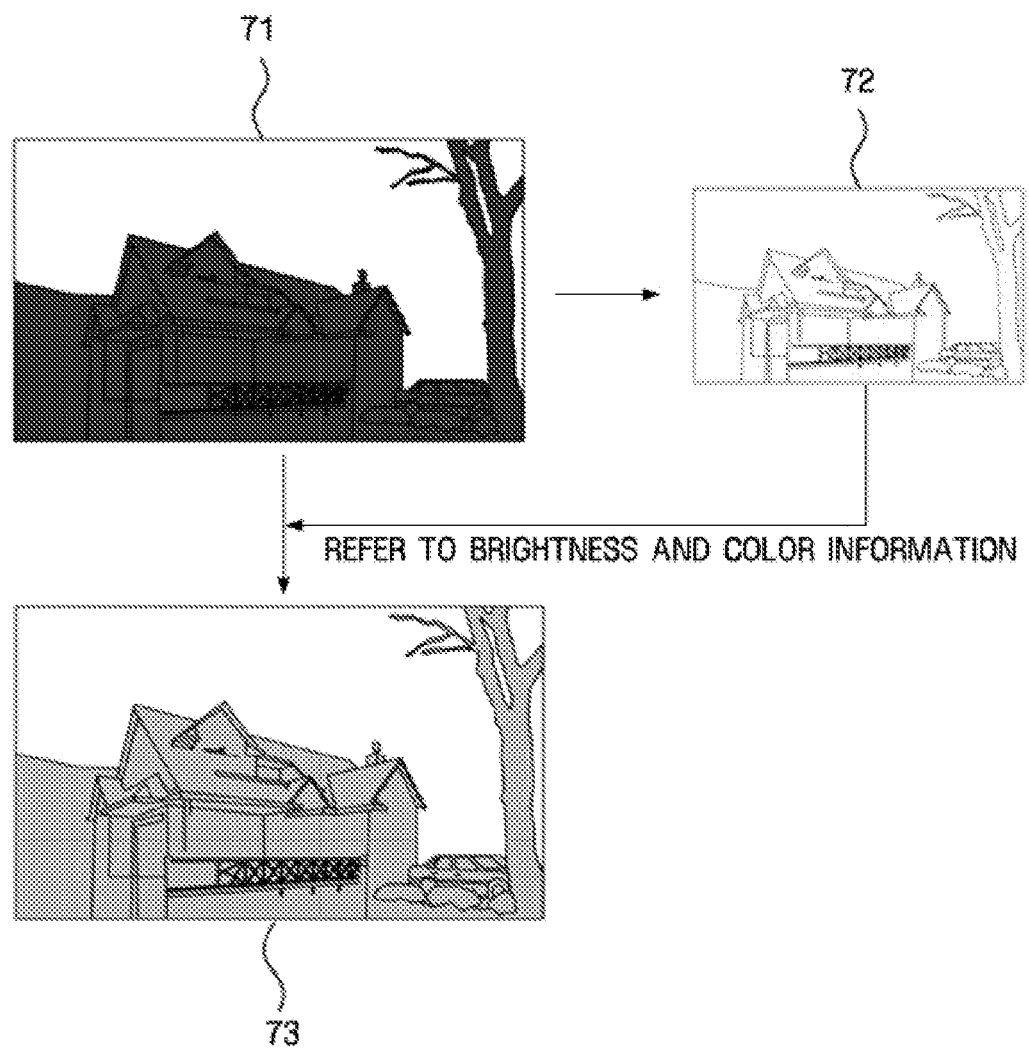
FIG. 12 illustrates a process of generating a final image using the third synthesis method of FIG. 11, according to an embodiment of the present invention.

FIG. 12 illustrates a process of generating a final image using the third synthesis method of FIG. 11.

Referring to FIG. 12, a first image 71 may be generated, e.g., by the first image generation unit 141, from an image acquired, e.g., by the image acquisition unit 130, and a second image 72 may be generated, from the first image 71, with resolution and brightness different from those of the first image 71, e.g., by the second image generation unit 142. Here, the second image 72 may be generated from the first image 71, e.g., by the second image generation unit 142, according to a predetermined resolution of the second image 72. Since the first image 71 may have higher contrast than the second image 72, its edges may be clearer. In addition, the color of the second image 72 may be clearer than that of the first image 71.

Next, brightness and color information of a pixel in the second image 72 may be referred to, e.g., by the image synthesis unit. Then, the brightness and color information of pixels of the first image, which form the pixel of the second image, may be corrected according to the brightness and color information referred to and a final image may be generated, e.g. by the image synthesis unit 150.

In the above embodiment, an image generation system, method and medium, which calculate the first exposure time of the first image to acquire the second image with predetermined brightness when the resolution of the second image is predetermined, have been described. Hereinafter, an image generation system, method and medium, which calculate resolution of a second image generated from a first image when the exposure time of the first image is predetermined, according to another embodiment of the present invention will be described with reference to FIG. 13.

Figure 13:
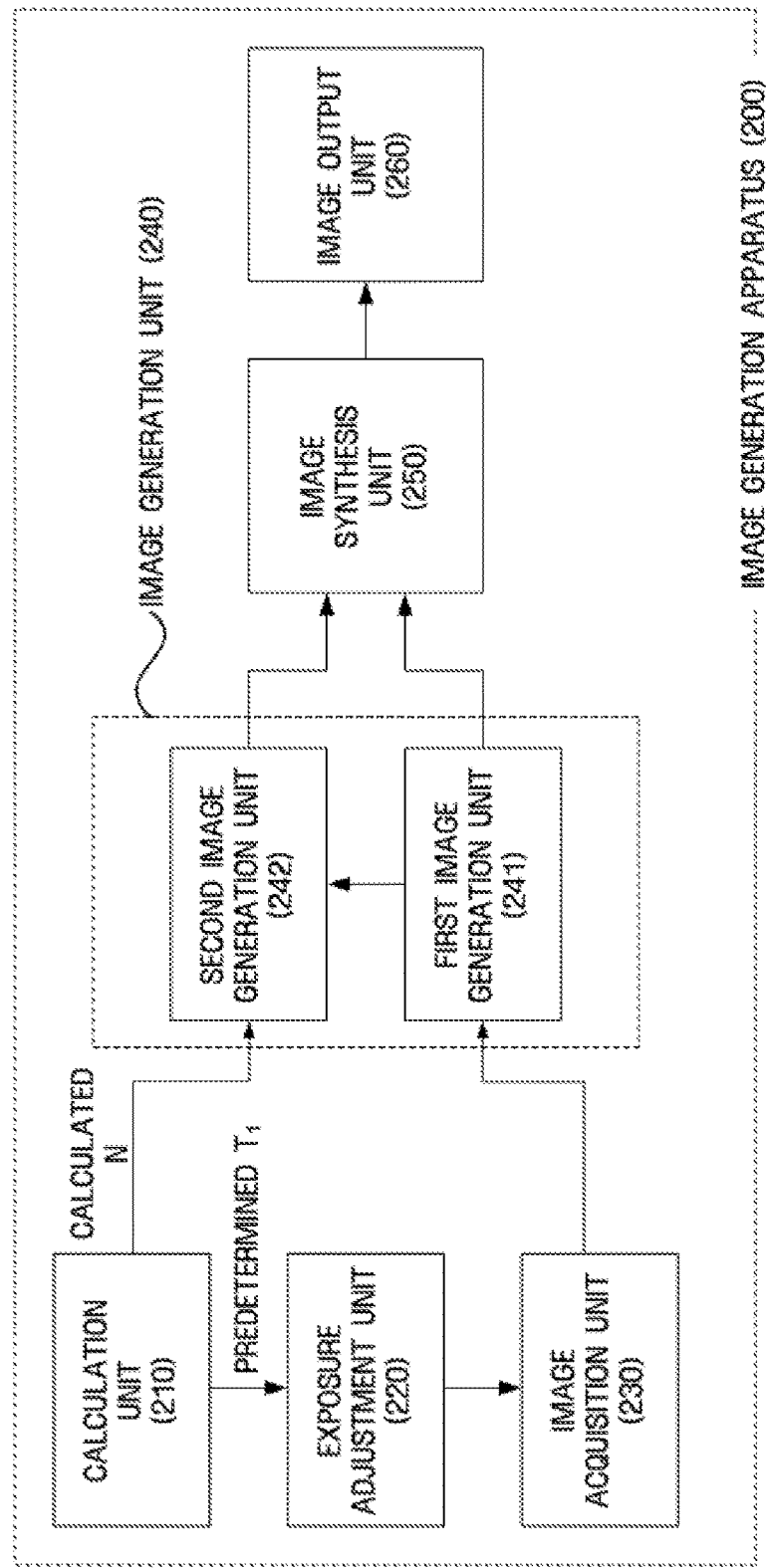
FIG. 13 illustrates an image generation system, according to a second embodiment of the present invention.

Since the operations of an image synthesis unit 250 and an image output unit 260 illustrated in FIG. 13 are identical to those of the image synthesis unit 150 and the image output unit 160 illustrated in FIG. 2, a detailed description thereof will be omitted. Thus, the description of the present embodiment may be focused on the operations of an image acquisition unit 230, a calculation unit 210, and an image generation unit 240.

The calculation unit 210 may calculate resolution of a second image based on a predetermined first exposure time, and a second exposure time, for acquiring the second image with predetermined brightness. Specifically, the calculation unit 210 may divide the second exposure time T2 for acquiring the second image with the predetermined brightness Y2 by the predetermined first exposure time T1 as in Equation (3).

$$N = \frac{T_2}{T_1},$$ Equation 3 where N indicates the number of pixels of the first image included in each pixel of the second image. For example, if N=4, each pixel of the second image may consist of four pixels, which use an identical color filter, in the first image. In other words, the resolution of the second image is a quarter of the resolution of the first image. The relationship between the resolution of the second image and that of the first image may be given, for example, by Equation (1) described above.

The image acquisition unit 230 may acquire an image of a subject according to the predetermined first exposure time.

Specifically, a first image generation unit 241 may generate the first image from an image acquired by the image acquisition unit. In this case, the acquired image and the first image may be understood as identical images.

A second image generation unit 242 may receive the first image from the first image generation unit 241 and generate the second image from the first image based on resolution information of the second image calculated by the calculation unit 210. For example, if a value of N, which is calculated, for example, using Equation (3), is 4, the second image generation unit 242 may generate the second image by corresponding four pixels of the first image, which use an identical color filter, to a pixel of the second image.

The image synthesis unit 250 may synthesize the first image generated by the first image generation unit 241 and the second image generated by the second image generation unit 242 and may generate a final image. In this case, the image synthesis unit 250 may synthesize the first and second images through the first synthesis or the second synthesis. Alternatively, the image synthesis unit 250 may correct brightness and color information of a plurality of pixels of the first image based on brightness and color information of a referred pixel in the second image and generates the final image.

FIG. 14 illustrates an image generation method used, for example, by the image generation system 200 of FIG. 13.

Referring to FIG. 14, in operation 710, resolution of a second image may be calculated, e.g., by the calculation unit 210, based on a predetermined first exposure time T1 and a second exposure time T2 for acquiring the second image with predetermined brightness Y2, and the calculated resolution of the second image may be provided, for example, to the second image generation unit 242.

A shutter may be adjusted, e.g., by the exposure adjustment unit 220, so that light can be received during the first exposure time, e.g., by the image acquisition unit 230. In the case of a camera sensor without a mechanical shutter, an optical sensor may be allowed to receive light during the first exposure time, e.g., by the exposure adjustment unit 220.

In operation 720, an image of a subject may be acquired based on an amount of light received during the first exposure time, e.g., by image acquisition unit 230.

In operation 730, a first image may be generated, e.g., by the first image generation unit 241, from the acquired image, e.g., an image acquired by the image acquisition unit 230. In the present embodiment, the first image may be understood as the acquired image. The first image may have resolution corresponding to the number of pixels included in a CIS of the image generation system 200 as illustrated in FIG. 3.

In operation 740, the second image may be generated e.g., by the second image generation unit 242, with lower resolution than the first image from the first image generated e.g., by the first image generation unit 241. Specifically, the second image may be generated, e.g., by second image generation unit 242, with reference to resolution information provided by the calculation unit 210. For example, if the resolution of the second image is a quarter of the resolution of the first image, the second image may be generated, e.g., by the second image generation unit 242, such that each pixel of the second image may include four pixels using an identical color filter in the first image.

In operation 750, the resolution of the first and second images may be matched and the first and second images may be synthesized with matching resolution, e.g., by the image synthesis unit 250. Here, the first and second images may be synthesized using the first synthesis method or the second synthesis method as in the previous embodiment. If the first and second images are synthesized using the second synthesis method, a final image may additionally be processed in order to increase the resolution of the final image, e.g., by the image synthesis unit 250. Alternatively, brightness and color information of the first image may be corrected based on brightness and color information of the second image referred to and a final image may be generated, e.g., by the image synthesis unit 250.

In operation 760, the final image generated by the image synthesis unit 250 may be displayed, e.g. on the image output unit 260.

An image generation system, method and medium, according to one or more embodiments of the present invention has been described with reference to block diagrams or flowchart illustrations. It may be understood that each block of the flowchart illustrations, and combinations of blocks in the flowchart illustrations, can be implemented by computer program instructions. These computer program instructions can be provided to a processor of a general purpose computer, special purpose computer, or other programmable data processing system, such that the instructions, which execute via the processor of the computer or other programmable data processing apparatus, implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instructions that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus implement the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, an image generation system, method and medium, according to the present invention provide at least one of the following advantages.

First, since a plurality of images with different luminance can be acquired in a single photographing operation, a high dynamic range image may be generated.

Second, an exposure time may be reduced, thereby enhancing user convenience.

Third, since the exposure time may be reduced, image blurring due to the shaking hands of a user during a long exposure time may be prevented.

Fourth, a high dynamic range image may be generated without modifying the structure of an image photographing system.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An image generation apparatus comprising:
at least one image sensor;
at least one processor; and
at least one memory storing instructions, which when executed by the at least one processor, cause an electronic device to:
acquire, using the at least one image sensor, an image of a scene from a single capture;
automatically generate, from the acquired image, a plurality of images of the scene, each with a different brightness; and
synthesize the plurality of generated images,
wherein a first exposure value for a first image is smaller than a second exposure value for a second image, and
wherein a brightness of the second image is brighter than a brightness of the first image.

2. The apparatus of claim 1, wherein the electronic device is configured to:
generate the first image and the second image, having a resolution that is lower than a resolution of the first image, from the acquired image.

3. The apparatus of claim 2, wherein:
the electronic device further generates at least one of a third image, by decreasing the resolution of the first image to the resolution of the second image, or a fourth image, by increasing the resolution of the second image to the resolution of the first image; and
the electronic device generates a final image by using either the first and the fourth images or the second and the third images.

4. The apparatus of claim 3, wherein the electronic device is configured to:
increase a resolution of the final image, if the second and the third images are used to generate the final image.

5. The apparatus of claim 2, wherein the electronic device may generate the second image having a plurality of the pixels included in the first image.

6. The apparatus of claim 1, further comprising wherein:
the electronic device is configured to calculate a first exposure value for obtaining the first image, based on a second exposure value for obtaining the second image, with predetermined brightness.

7. The apparatus of claim 6, wherein the electronic device generates the first image from the image acquired by the electronic device according to the calculated first exposure value.

8. The apparatus of claim 7,
wherein the electronic device is configured to determine a resolution of the second image based on the first exposure value and the second exposure value for obtaining the second image with the predetermined brightness.

9. The apparatus of claim 8, wherein the electronic device determines the a resolution of the second image to be a value obtained after a ratio of the first exposure value to the second exposure value is multiplied by resolution of the first image.

10. An image generation method comprising:
acquiring, by an electronic device, an image of a scene from a single capture;
automatically generating, by the electronic device, from the acquired image, a plurality of images of the scene, each with a different brightness; and
synthesizing, by the electronic device, the plurality of generated images,
wherein a first exposure value for a first image is smaller than the second exposure value for a second image, and
wherein a brightness of the second image is brighter than a brightness of the first image.

11. The method of claim 10, wherein the generating of the images comprises:
generating, by the electronic device, the first image and the second image, having a resolution that is lower than a resolution of the first image, from the acquired image.

12. The method of claim 11, further comprising:
generating, by the electronic device, at least one of a third image, by decreasing the resolution of the first image to the resolution of the second image, or a fourth image, by increasing the resolution of the second image to the resolution of the first image; and
generating, by the synthesis unit, a final image using either the first and the fourth images or the second and the third images.

13. The method of claim 12, further comprising:
increasing, by the synthesis unit, a resolution of the final image, if the second and the third images are used to generate the final image.

14. The method of claim 11, further comprising:
generating, by the electronic device, the second image having a plurality of the pixels included in the first image.

15. The method of claim 10, further comprising:
calculating, by the electronic device, a first exposure value for obtaining a first image, based on a second exposure value for obtaining a second image, with predetermined brightness.

16. The method of claim 15, wherein the generating of the first image comprises generating the first image from the acquired image according to the calculated first exposure value.

17. The method of claim 16, further comprising determining a resolution of the second image based on the first exposure value and the second exposure value for obtaining the second image with the predetermined brightness.

18. The method of claim 17, wherein the determining of the resolution of the second image comprises determining the resolution of the second image to be a value obtained after a ratio of the first exposure value to the second exposure value is multiplied by a resolution of the first image.

* * * * *